United States Patent
Li et al.

(10) Patent No.: US 12,169,682 B2
(45) Date of Patent: Dec. 17, 2024

(54) PROCESSING METHOD AND DEVICE FOR DISPLAYING INPUT INFORMATION BASED ON BEHAVIOR PARAMETER FOR INPUTTING THE INPUT INFORMATION AND ATTRIBUTE OF THE INPUT INFORMATION

(71) Applicant: Lenovo (Beijing) Limited, Beijing (CN)

(72) Inventors: Xiang Li, Beijing (CN); Yuguang Lin, Beijing (CN); Rui Shen, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 30 days.

(21) Appl. No.: 17/693,413

(22) Filed: Mar. 14, 2022

(65) Prior Publication Data

US 2023/0055057 A1    Feb. 23, 2023

(30) Foreign Application Priority Data

Aug. 20, 2021 (CN) .......................... 202110960271.1

(51) Int. Cl.
*G06F 3/04883* (2022.01)
*G06F 3/01* (2006.01)
*G06F 3/14* (2006.01)
*G06F 3/16* (2006.01)
*G06F 40/109* (2020.01)

(52) U.S. Cl.
CPC .......... *G06F 40/109* (2020.01); *G06F 3/017* (2013.01); *G06F 3/04883* (2013.01); *G06F 3/1423* (2013.01); *G06F 3/16* (2013.01)

(58) Field of Classification Search
None
See application file for complete search history.

(56) References Cited

U.S. PATENT DOCUMENTS

| | | | | |
|---|---|---|---|---|
| 2005/0027525 A1* | 2/2005 | Funakura | ............... | G10L 17/26 704/235 |
| 2007/0162237 A1* | 7/2007 | Demizu | ................. | G06F 30/20 702/22 |
| 2014/0108992 A1* | 4/2014 | Bi | ........................ | G06F 3/0412 715/773 |
| 2014/0164974 A1* | 6/2014 | Kim | .................... | G06F 3/04883 715/773 |
| 2014/0171153 A1* | 6/2014 | Kienzle | ................ | G06F 3/0237 455/566 |
| 2015/0051911 A1* | 2/2015 | Choi | ...................... | G06F 40/00 704/253 |
| 2015/0346996 A1* | 12/2015 | Ogawa | ................. | G06F 3/0233 715/863 |
| 2016/0140387 A1* | 5/2016 | Sugiura | ................. | G06V 30/32 382/189 |
| 2018/0068662 A1* | 3/2018 | Schlippe | ................ | G10L 25/90 |
| 2020/0334452 A1* | 10/2020 | Gurbuz | .................. | G01S 7/354 |

\* cited by examiner

*Primary Examiner* — Rinna Yi
(74) *Attorney, Agent, or Firm* — ANOVA LAW GROUP, PLLC (57) ABSTRACT

A processing method includes obtaining input information from an input member of an electronic apparatus. The input information includes a behavior parameter in a process of inputting a target word. The method further includes determining a display parameter of the target word based on the behavior parameter to display the target word on a target display according to the display parameter. The display parameter represents feature information when inputting the target word.

18 Claims, 6 Drawing Sheets

PROCESSING METHOD AND DEVICE FOR DISPLAYING INPUT INFORMATION BASED ON BEHAVIOR PARAMETER FOR INPUTTING THE INPUT INFORMATION AND ATTRIBUTE OF THE INPUT INFORMATION

CROSS-REFERENCE TO RELATED APPLICATION

This application claims priority to Chinese Patent Application No. 202110960271.1, filed on Aug. 20, 2021, the entire content of which is incorporated herein by reference.

TECHNICAL FIELD

The present disclosure generally relates to the processing technology in the information technology field and, more particularly, to a processing method and device.

BACKGROUND

In an electronic device, such as a cellphone, a tablet, etc., after a word is entered, if a user wants to change the font style of the word, such as thickness, color, etc., the user needs to set the font style manually. Such an operation method is not intelligent and is also inefficient.

SUMMARY

Embodiments of the present disclosure provide a processing method. The method includes obtaining input information of an operator acting on an input member of an electronic apparatus. The input information includes a behavior parameter of the operator in a process of inputting a target word. The method further includes determining a display parameter of the target word based on the behavior parameter to display the target word on a target display according to the display parameter. The display parameter represents feature information when the operator inputs the target word.

Embodiments of the present disclosure provide a processing device, including an acquisition circuit and a determination circuit. The acquisition circuit is configured to obtain input information of an operator acting on an input member of an electronic apparatus. The input information includes a behavior parameter of the operator in a process of inputting a target word. The determination circuit is configured to determine a display parameter of the target word based on the behavior parameter to display the target word on a target display according to the display parameter. The display parameter represents feature information when the operator inputs the target word.

Embodiments of the present disclosure provide an electronic apparatus, including a processor and a memory. The memory stores a processing program that, when executed by the processor, causes the processor to obtain input information of an operator acting on an input member of the electronic apparatus. The input information includes a behavior parameter of the operator in a process of inputting a target word. The processor is further caused to determine a display parameter of the target word based on the behavior parameter to display the target word on a target display according to the display parameter. The display parameter represents feature information when the operator inputs the target word.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

The technical solutions of the present disclosure are further described in detail below in connection with the accompanying drawings and embodiments of the present disclosure.

The term "embodiments of the present disclosure" or "previous embodiments" mentioned through the specification means that a particular feature, structure, or characteristic associated with embodiments is included in at least one embodiment of the present disclosure. Thus, the term "in an embodiment of the present disclosure" or "in previous embodiments" shown in various places throughout the specification does not necessarily refer to a same embodiment. Furthermore, the particular feature, structure, or characteristic may be combined in any suitable manner in one or more embodiments. In various embodiments of the present disclosure, a size of a sequence number of the above-mentioned processes does not mean an execution sequence. The execution sequence of each process should be determined by a function and internal logic of the process, which should not limit an implementation process of embodiments of the present disclosure. The above-mentioned sequence number of embodiments of the present disclosure is only for description and does not represent the advantages or disadvantages of embodiments of the present disclosure.

Unless otherwise specified, any step of embodiments of the present disclosure executed by the electronic apparatus may be executed by a processor of the electronic apparatus. Embodiments of the present disclosure do not limit the sequence in which the electronic apparatus performs the following steps. In addition, manners in which data is processed in different embodiments may be a same method or different methods. Any step in embodiments of the present disclosure may be independently executed by the electronic apparatus. That is, the electronic apparatus may execute any step in embodiments of the present disclosure independent of execution of another step.

Specific embodiments described herein are only used to explain the present disclosure but not to limit the present disclosure.

Figure 1:
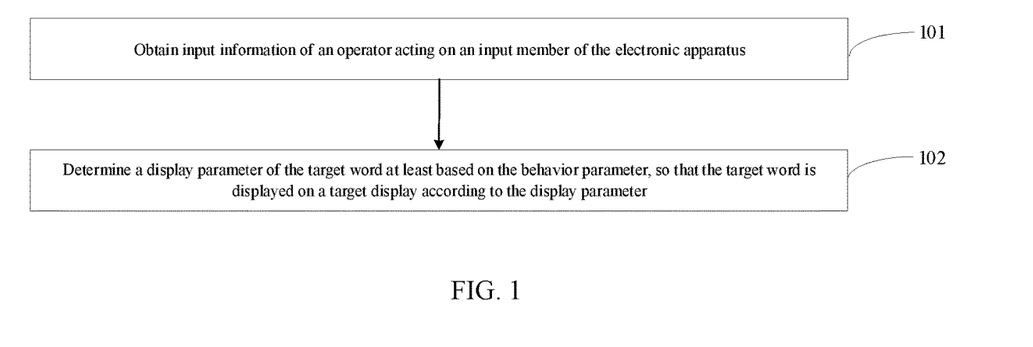
FIG. 1 illustrates a schematic flowchart of a processing method according to some embodiments of the present disclosure.

Embodiments of the present disclosure provide a processing method. The processing method may be applied to an electronic apparatus. As shown in FIG. 1, the method includes the following steps.

At 101, input information of an operator acting on an input member of the electronic apparatus is obtained.

The input information may include a behavior parameter of the operator in a process of inputting a target word.

In embodiments of the present disclosure, the operator may refer to a limb of an input object used to input information to the input member of the electronic apparatus or a stylus. In some embodiments, the input information may also include the input object, the behavior parameter, an input content (such as a target word), etc. The behavior parameter may refer to behavior information generated during a process that the operator inputs the target word. The input member may refer to a member of the electronic apparatus, which is configured to receive the information inputted by the input object. The input member may refer to a keyboard, a handwriting area, a microphone, a touch screen, etc.

The input information may be collected by the electronic apparatus during the process of the operator inputting the target word into the input member of the electronic apparatus. The behavior parameter may be different according to different manners of the operator inputting the target word to the input member. In some embodiments, the behavior parameter may include an input trajectory parameter, a voice input feature parameter, and a posture input parameter. In some embodiments, a posture may refer to one or more gestures of the operator.

At 102, a display parameter of the target word is determined at least based on the behavior parameter so that the target word is displayed on a target display according to the display parameter.

The display parameter may at least represent feature information when the operator inputs the target word.

In embodiments of the present disclosure, the electronic apparatus may perform analysis and processing according to the obtained behavior parameter to obtain the display parameter used to display the target word. Then, the electronic apparatus may display the target word on the target display with the display parameter. In some embodiments, the display parameter may include a first display parameter, a second display parameter, a third display parameter, and a fourth display parameter. The first display parameter, the second display parameter, the third display parameter, and the fourth display parameter may be different from each other. The target display may refer to a display of the electronic apparatus or a display of another electronic apparatus having a communication connection with the electronic apparatus.

The processing method of embodiments of the present disclosure includes obtaining the input information of the operator acting on the input member of the electronic apparatus. The input information may include the behavior parameter of the operator in the process of inputting the target word. The processing method further includes determining the display parameter of the target word at least based on the behavior parameter so that the target word can be displayed on the target display according to the display parameter. The display parameter can at least represent the feature information when the operator inputs the target word. As such, the electronic apparatus can directly determine the display parameter for displaying the target word according to the behavior parameter during the process of the operator inputting the target word. The user does not need to manually modify the display parameter of the target word. Thus, the problem that the font style of the modified word input into the electronic apparatus cannot reflect a personality of an input person can be solved in the existing technology. Intelligence of the electronic apparatus and writing efficiency by using the electronic apparatus may be improved.

Figure 2:
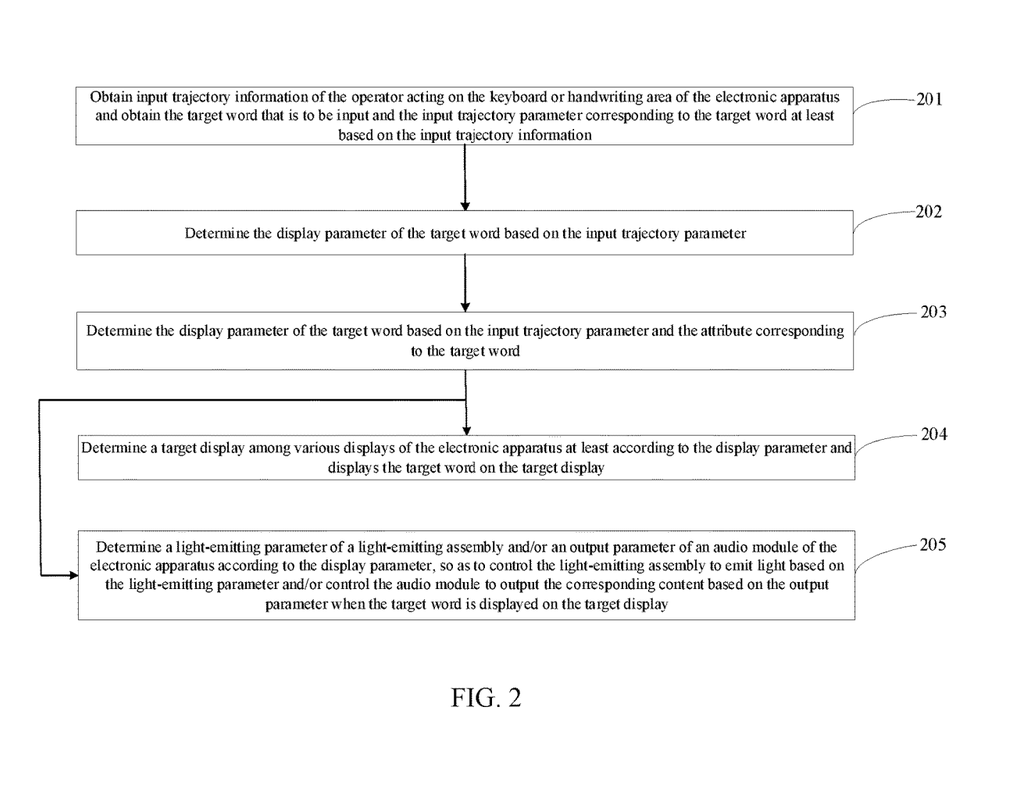
FIG. 2 illustrates a schematic flowchart of another processing method according to some embodiments of the present disclosure.
Figure 3:
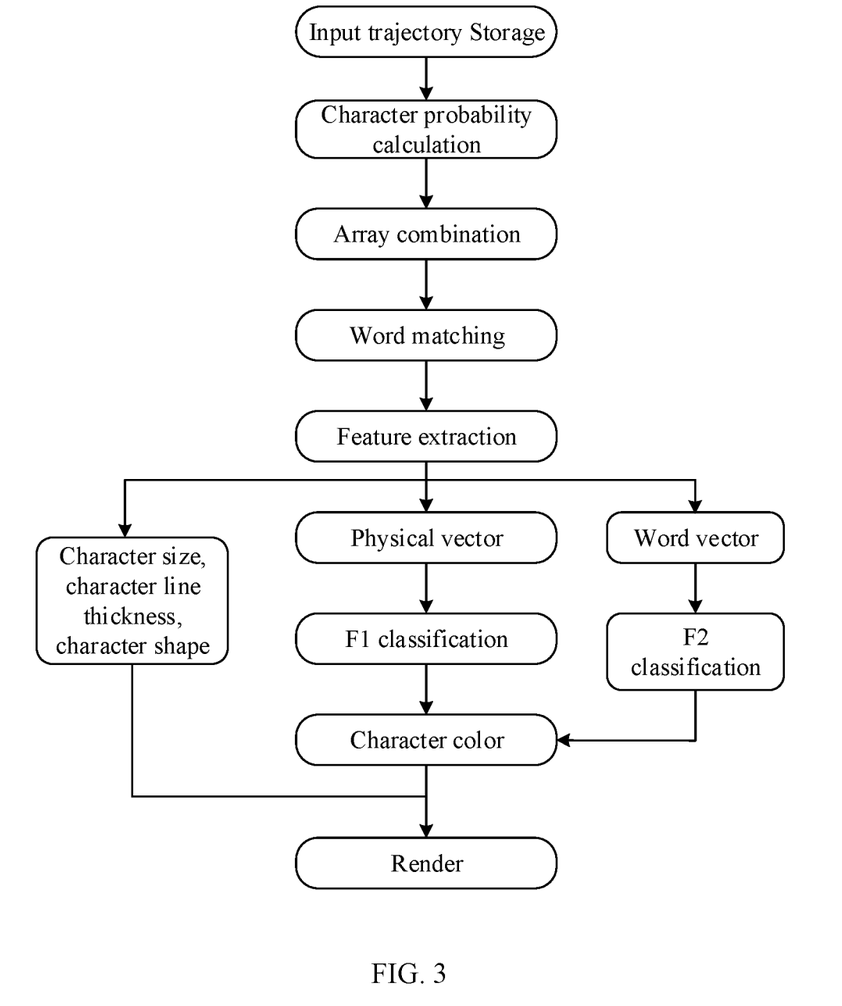
FIG. 3 illustrates a schematic flowchart of still another processing method according to some embodiments of the present disclosure.

Embodiments of the present disclosure provide a processing method. The behavior parameter may include an input trajectory parameter. As shown in FIG. 2 and FIG. 3, the method includes the following steps.

At 201, the electronic apparatus obtains input trajectory information of the operator acting on the keyboard or handwriting area of the electronic apparatus and obtains the target word that is to be input and the input trajectory parameter corresponding to the target word at least based on the input trajectory information.

The keyboard or handwriting area may refer to the input member of the electronic apparatus. That is, the input trajectory information may be obtained when the operator inputs the target word into the electronic apparatus through the keyboard or the handwriting area. Moreover, the input trajectory parameter may be obtained by analyzing and processing the input trajectory information.

In embodiments of the present disclosure, the target word input by the operator may be determined by analyzing the input trajectory information to obtain a touchpoint corresponding to the input trajectory information, determining touch attribute information of the touchpoint and a character corresponding to the touchpoint, determining a target character from the character corresponding to the touchpoint, and determining the target word based on the target character.

In some embodiments, determining the target character from the character corresponding to the touchpoint and determining the target word based on the target character includes the following processes.

At A1, a target touchpoint is obtained from touchpoints other than a first touchpoint and a last touchpoint, and the character corresponding to the target touchpoint is determined based on the character corresponding to the touchpoint.

If the last touchpoint is a punctuation mark, the target touchpoint may be determined by excluding the last two touchpoints.

At A2, a character probability of the character corresponding to the target touchpoint is calculated, and the target character with the character probability greater than a target probability threshold is obtained.

The character probability may be obtained by first calculating a number of touchpoints corresponding to each character in the characters corresponding to the target touchpoints, and, then based on the number of touchpoints corresponding to each character and a number of touchpoints corresponding to the input trajectory, determining the character probability of each character. The target probability threshold may be preset based on historical data.

At A3, the target word is determined based on the target character and the first and last characters of the characters corresponding to the target touchpoint.

The target word may be further obtained by combining the target character and the first and last characters of the characters corresponding to the target touchpoint to obtain a candidate word, matching the candidate word with words in a word database to determine a matched word, and then determining the target word from matched words.

If a word that is to be selected is not in English, e.g., in Chinese, a corresponding pinyin of Chinese may need to map to English characters to form a corresponding word. Then, the matched words may be returned to form a word list. The user may select the target word from the word list.

In some embodiments, data with style (X, Y, T, P, Label) may be formed for each touchpoint. X denotes an abscissa of the touchpoint, and Y denotes an ordinate of the touchpoint, T denotes a current time, P denotes an input pressure of the touchpoint, and Label denotes a character corresponding to the touchpoint.

At 202, the electronic apparatus determines the display parameter of the target word based on the input trajectory parameter.

The input trajectory parameter may refer to some parameters corresponding to when the input trajectory information is formed during the process of obtaining the target word. In some embodiments, the input trajectory parameter may include at least one of an input rate, an input pressure, or a trajectory direction change parameter. The display parameter may at least include a character size, a character line thickness, a character shape, or a character color.

In embodiments of the present disclosure, step 202 may be implemented by at least one of the following steps.

At 202a, the electronic apparatus determines the first display parameter of the target word based on the input rate of the input trajectory parameter.

Step 202a includes determining the target input trajectory corresponding to each character of the target characters (202a1) and determining the input rate based on the input trajectory parameter of the target touchpoint of the target input trajectory and determining the first display parameter of the target word based on the input rate (202a2).

In embodiments of the present disclosure, the electronic apparatus may calculate the input rate based on the number of target touchpoints, touch start time of the target touchpoints, and touch end time of the target touchpoints. Then, the electronic apparatus may calculate the first display parameter based on the input rate and a first constant. The target touchpoint may refer to the touchpoint included in the target input trajectory. The first display parameter may refer to the character size.

In some embodiments, a time difference between the touch start time and the touch end time of the target touchpoints may be calculated first. Then, the input rate may be obtained by dividing the number of target touchpoints by the time difference. The character size may be obtained by multiplying the input rate by the first constant.

At 202b, the electronic apparatus determines a second display parameter of the target word based on the input pressure of the input trajectory parameter.

Step 202b includes determining the second display parameter of the target word based on the input pressure of the target touchpoints and the number of the target touchpoint.

In embodiments of the present disclosure, the electronic apparatus may calculate the input pressure based on the touch pressure of the target touchpoint and the number of target touchpoints. Then, the electronic apparatus may determine the second display parameter based on the input pressure and a second constant. The second display parameter may refer to the character line thickness.

In some embodiments, the touch pressures of all the target touchpoints may be added to obtain a pressure sum value. The pressure sum value may be divided by the number of the target touchpoints to obtain the input pressure. Then, the input pressure may be multiplied by the second constant to obtain the character line thickness.

Step 202c, the electronic apparatus determines a third display parameter of the target word based on a trajectory direction change parameter of the input trajectory parameter.

Step 202c includes determining a basic touchpoint from the target touchpoints and determining the third display parameter of the target word based on position information of the first touchpoint, position information of the last touchpoint, and position information of the basic touchpoint of the target touchpoints.

In embodiments of the present disclosure, the electronic apparatus may determine perpendicular distances between each touchpoint in the target touchpoints and a connection line formed by the first touchpoint and the last touchpoint based on the position information of the target touchpoints. The electronic apparatus may further determine the basic touchpoint from the target touchpoints based on the perpendicular distances, determining a target angle based on the position information of the first touchpoint, the position information of the last touchpoint, and the position information of the basic touchpoint, and finally determining the third display parameter based on the target angle and the third constant. The third display parameter may refer to the character shape.

In some embodiments, the perpendicular distances between each touchpoint of the target touchpoints and the connection line formed by the first touchpoint and the last touchpoint may be compared with each other. A touchpoint with a largest perpendicular distance may be selected as the basic touchpoint and marked as touchpoint C. Then, an included angle ACB may be determined as the target angle according to positions of the first touchpoint A, the last touchpoint B, and the touchpoint C. Then, the target angle may be multiplied by the third constant to obtain the character shape. The character shape may refer to the smoothness of the character.

Step 202 may be implemented by any one or two steps of steps 202a, 202b, and 202c or by three steps 202a, 202b, and 202c together.

At 203, the electronic apparatus determines the display parameter of the target word based on the input trajectory parameter and the attribute corresponding to the target word.

In embodiments of the present disclosure, step 203 may be implemented by the following steps.

At 203a, a fourth display parameter of the target word is determined based on the input trajectory parameter and an emotional attribute and/or a meaning attribute of the target word.

Step 203a can be implemented by the following steps.

At 203a1, a reference speed, a reference pressure, and a reference angle are determined based on reference touch attribute information of reference touchpoints.

In some other embodiments of the present disclosure, the reference speed may be calculated based on a number of the reference touchpoints, touch start time of the reference touchpoints, and touch end time of the reference touchpoints. The reference pressure may be calculated based on the touch pressure of the reference touchpoints and the number of the reference touchpoints. A basic reference touchpoint may be determined based on perpendicular distances between each touchpoint of the reference touchpoints and a connection line formed by a first touchpoint and a tail touchpoint of the reference touchpoints. The reference angle may be determined based on position information of the first touchpoint of the reference touchpoints, position information of the last touchpoint of the reference touchpoints, and position information of the basic reference touchpoint.

For determination methods of the reference speed, the basic reference touchpoint, and the reference angle, reference may be made to the determination method of the input rate, the basic touchpoint, and the target angle embodiments of the present disclosure, which is not be repeated here.

At 203a2, a first vector is generated based on the reference speed, the reference pressure, and the reference angle, and the reference touchpoints are classified based on the first vector to obtain a first classification result.

The first vector may refer to a physical vector V1. A classifier F1 may be configured to classify the reference touchpoints. The classifier F1 may refer to any classifier that can classify the reference touchpoints. The first classification result may include a class C1 with a highest output probability and a probability P1 of the class C1.

At 203a3, a natural language processing algorithm is used to generate a second vector for the reference touchpoints, and the reference touchpoints are classified based on the second vector to obtain a second classification result.

The second vector may refer to a word vector V2. A classifier F2 may be configured to classify the reference touchpoints. The classifier F2 may refer to any classifier that can classify the reference touchpoints. The second classification result may include a class C2 with a highest probability and a probability P2 of the class C2.

At 203a4, a character color is determined based on the first classification result, the second classification result, and basic color information corresponding to each classification.

In embodiments of this disclosure, when C1 is equal to C2, a final classification may be C1. When C1 is not equal to C2, a1×P1 and a2×P2 may be calculated and compared, and a class corresponding to a larger one of a1×P1 and a2×P2 may be the final classification. a1 and a2 are constant weights. Each class of K classes may correspond to a character color. Then, the character color may be the color of the touchpoint corresponding to the final classification. Each class corresponds to a character color.

The emotional attribute may be determined based on the attribute of the word or based on a context in an interactive content. Moreover, the emotional attribute of embodiments of the present disclosure may be determined based on the formed first vector V1. The meaning attribute may be determined based on the formed second vector V2.

At 204, the electronic apparatus determines a target display among various displays of the electronic apparatus at least according to the display parameter and displays the target word on the target display.

In embodiments of the present disclosure, after the display parameter of the target word is determined, the target display may be determined from the displays of the electronic apparatus. Then, the target word may be displayed on the target display with the display parameter. The electronic apparatus may include a plurality of displays. The target display may be determined from the plurality of displays of the electronic apparatus according to an actual application scenario and the display parameter. In some other embodiments, the target display may be determined by the display parameter and configuration parameters of the plurality of displays. That is, the target display may be determined according to a matching degree between the display parameter and the configuration parameters of the plurality of displays. In some other embodiments, the target display may be determined from the plurality of displays according to whether another electric apparatus communicates with the electronic apparatus.

At 205, the electronic apparatus determines a light-emitting parameter of a light-emitting assembly and/or an output parameter of an audio module of the electronic apparatus according to the display parameter, so as to control the light-emitting assembly to emit light based on the light-emitting parameter and/or control the audio module to output the corresponding content based on the output parameter when the target word is displayed on the target display.

In embodiments of the present disclosure, when the target word is actually displayed, an animation or video information representing the meaning of the target word may be displayed by using the determined light-emitting parameter on the light-emitting assembly, and/or an audio corresponding to the animation may be output by using the determined output parameter on the audio module. Corresponding information may be displayed on the light-emitting assembly and the audio module at the same time, or the corresponding information may be displayed on one of the light-emitting assembly and the audio module.

In embodiments of the present disclosure, one step of steps 202 and 203 may be selected to be executed, or both steps 202 and 203 may be executed. FIG. 2 shows that both steps 202 and 203 are executed.

For the explanation of the same or corresponding steps of embodiments of the present disclosure and some other embodiments, reference may be made to the descriptions in some other embodiments, which is not repeated here.

The processing method of embodiments of the present disclosure includes directly determining the display parameter displayed by the target word according to the behavior parameter in the process of the operator inputting the target word. The user may not need to manually modify the display parameter of the target word. Thus, the problem in the existing technology that the font style of the modified word input to the electronic apparatus cannot reflect the personality of the input person may be solved. The intelligence of the electronic apparatus and the writing efficiency by using the electronic apparatus may be improved.

Figure 4:
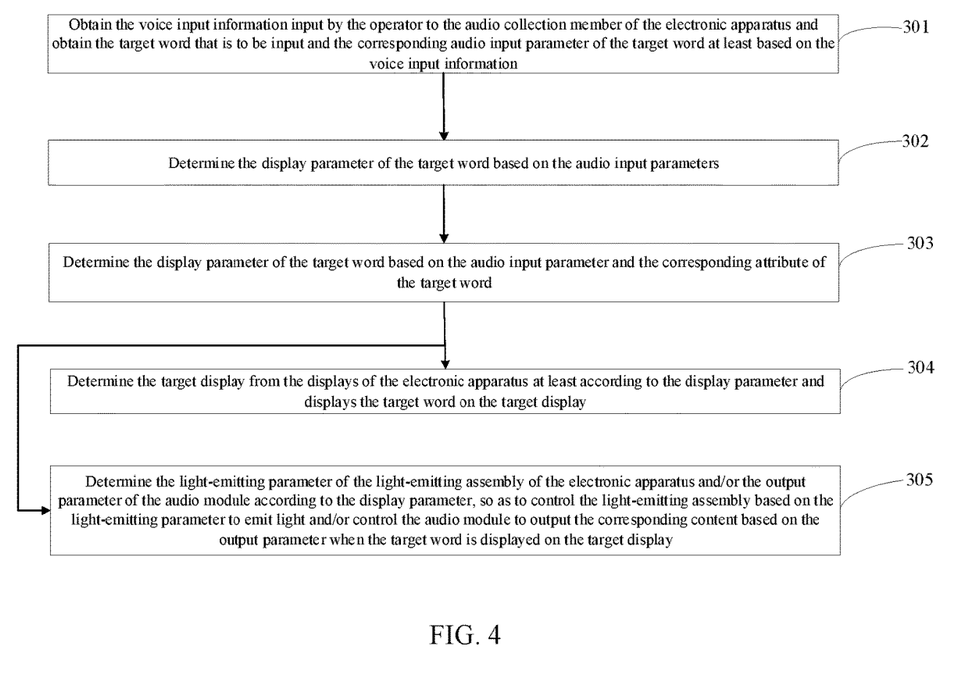
FIG. 4 illustrates another schematic flowchart of a processing method according to some embodiments of the present disclosure.

Embodiments of the present disclosure provide a processing method. As shown in FIG. 4, the method includes the following steps.

At 301, the electronic apparatus obtains the voice input information input by the operator to the audio collection member of the electronic apparatus and obtains the target word that is to be input and the corresponding audio input parameter of the target word at least based on the voice input information.

At 302, the electronic apparatus determines the display parameter of the target word based on the audio input parameters.

The audio input parameter may include at least one of a volume, an intonation, a tone, a timbre, or a voiceprint. The display parameter may include at least a character size, a character line thickness, a character shape, or a character color.

In embodiments of the present disclosure, step 302 may include analyzing the audio input parameter to obtain the volume and determining the first display parameter of the target word based on a correspondence between the volume and the character size and the volume. The first display parameter may include the character size.

Step 302 may further include analyzing the audio input parameter to obtain the intonation and determining the second display parameter of the target word based on the correspondence between the intonation and the character size and the intonation. The second display parameter may include the character line thickness.

Step 302 may further include analyzing the audio input parameter to obtain the tone and determining the third display parameter of the target word based on the calmness of the tone. The third display parameter may include the character shape.

At step 303, the electronic apparatus determines the display parameter of the target word based on the audio input parameter and the corresponding attribute of the target word.

In embodiments of the present disclosure, the audio input parameter may be analyzed to obtain the timbre and the voiceprint. Then, the fourth display parameter of the target word may be determined based on the timbre, the voiceprint, and the emotional attribute and/or the meaning attribute of the target word. The fourth display parameter may include the character color.

At 304, the electronic apparatus determines the target display from the displays of the electronic apparatus at least according to the display parameter and displays the target word on the target display.

At 305, the electronic apparatus determines the light-emitting parameter of the light-emitting assembly of the electronic apparatus and/or the output parameter of the audio module according to the display parameter, so as to control the light-emitting assembly based on the light-emitting parameter to emit light and/or control the audio module to output the corresponding content based on the output parameter when the target word is displayed on the target display.

In some embodiments, one of steps 302 and 303 may be selected to be executed, or both steps 302 and 303 may be executed. FIG. 4 shows that both steps 302 and 303 are executed.

For descriptions of the same or corresponding steps in embodiments of the present disclosure and some other embodiments, reference may be made to description of some other embodiments, which is not repeated here.

The processing method of embodiments of the present disclosure may include directly determining the display parameter displayed by the target word according to the behavior parameter of the operator during the process of inputting the target word. The user may not need to manually modify the display parameter of the target word. Thus, the problem in the existing technology that the font style of the modified word input to the electronic apparatus cannot reflect the personality of the input person may be solved. The intelligence of the electronic apparatus and the writing efficiency by using the electronic apparatus may be improved.

Figure 5:
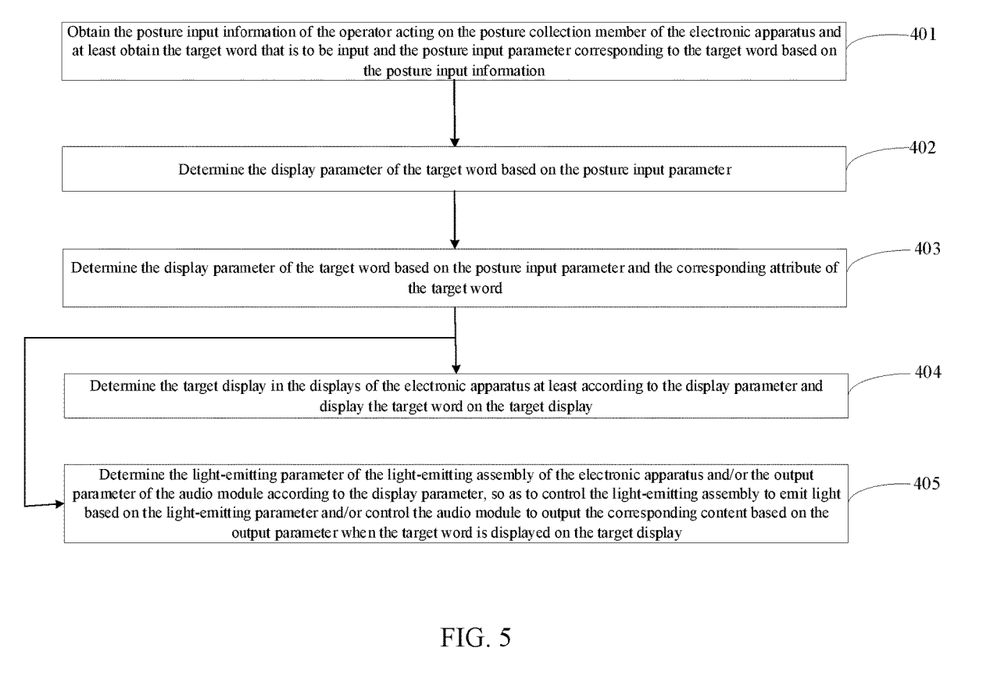
FIG. 5 illustrates another schematic flowchart of another processing method according to some embodiments of the present disclosure.

Embodiments of the present disclosure provide a processing method. As shown in FIG. 5, the method includes the following steps.

At 401, the electronic apparatus obtains the posture input information of the operator acting on the posture collection member of the electronic apparatus and at least obtains the target word that is to be input and the posture input parameter corresponding to the target word based on the posture input information.

In embodiments of the present disclosure, the posture input information may be information input to the electronic apparatus after the user performs a posture operation on the electronic apparatus using the body of the user or an operation using another portion of the body.

At 402, the electronic apparatus determines the display parameter of the target word based on the posture input parameter.

The posture input parameter may include at least one of a posture change speed, a posture change amplitude, and a posture change frequency. The display parameter may include at least the character size, the character line thickness, the character shape, or the character color.

In embodiments of the present disclosure, step 402 may be implemented by analyzing the posture input parameter to obtain the posture change speed and determining the first display parameter of the target word based on the posture change speed. The first display parameter may include the character size.

Step 402 may further include analyzing the posture input parameter to obtain the posture change amplitude and determining the second display parameter of the target word based on the matching degree between the posture change amplitude and the target amplitude. The second display parameter may include the character line thickness.

Step 402 may further include analyzing the posture input parameter to obtain the posture change frequency and determining the third display parameter of the target word based on a change trend of the posture change frequency. The third display parameter may include the character shape.

At 403, the electronic apparatus determines the display parameter of the target word based on the posture input parameter and the corresponding attribute of the target word.

In embodiments of the present disclosure, the posture input parameter can be analyzed to obtain the posture change time. The fourth display parameter of the target word can be determined based on a change trend of the posture change time and the emotional attribute and/or the meaning attribute of the target word. The fourth display parameter may include the character color.

At 404, the electronic apparatus determines the target display in the displays of the electronic apparatus at least according to the display parameter and displays the target word on the target display.

At 405, the electronic apparatus determines the light-emitting parameter of the light-emitting assembly of the electronic apparatus and/or the output parameter of the audio module according to the display parameter, so as to control the light-emitting assembly to emit light based on the light-emitting parameter and/or control the audio module to output the corresponding content based on the output parameter when the target word is displayed on the target display.

In embodiments of the present disclosure, one of steps 402 and 403 may be selected to be executed, or both steps 402 and 403 may be executed. FIG. 5 shows that both steps 402 and 403 are executed.

For descriptions of the same or corresponding steps in embodiments of the present disclosure and some other embodiments, reference may be made to descriptions in some other embodiments, which is not repeated here.

The processing method of embodiments of the present disclosure may include directly determining the display parameter displayed by the target word according to the behavior parameter of the operator during the process of inputting the target word. The user may not need to manually modify the display parameter of the target word. Thus, the problem in the existing technology that the font style of the modified word input to the electronic apparatus cannot reflect the personality of the input person may be solved. The intelligence of the electronic apparatus and the writing efficiency by using the electronic apparatus may be improved.

In some other embodiments of the present disclosure, the method may further include the following steps At A1, if the electronic apparatus is connected to the second electronic apparatus, a configuration parameter of the display of the second electronic apparatus is obtained, and the display parameter of the target word based on the configuration parameter and the behavior parameter is determined, or the display parameter is adjusted based on the configuration parameter.

The second electronic apparatus may refer to an augmented reality (AR) apparatus. Thus, the relevant configuration parameter of the display of the second electronic apparatus may be combined with the behavior parameter of the operator to obtain the display parameter. In some embodiments, the behavior parameter may also include the input trajectory parameter, the audio input parameter, and the posture input parameter. For the specific determination process, reference may be made to the description in a corresponding embodiment, which is not repeated here.

The display parameter may be adjusted so that the display parameter may be adapted to the relevant configuration parameter of the display of the second electronic apparatus.

In some other embodiments, at A2, if the electronic apparatus is in a specific operation mode, the display parameter is adjusted at least based on the specific operation mode.

The specific operation mode may refer to a mode in which the electronic apparatus is currently turning on. In some embodiments, the specific operation mode may include an eye protection mode. Thus, the display parameter may be adjusted to be adapted to the specific operation mode.

Figure 6:
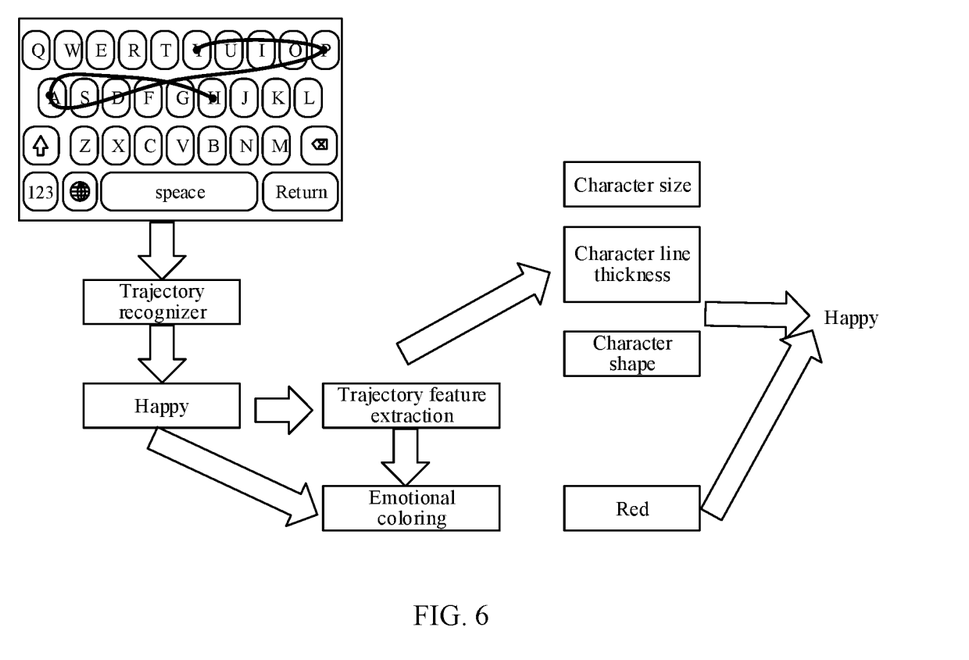
FIG. 6 illustrates a schematic flowchart showing a display parameter for determining a target phrase according to some embodiments of the present disclosure.

In some other embodiments of the present disclosure, as shown in FIG. 6, the target word of Happy is taken as an example for description.

1. A trajectory of Happy is saved to an array Points. Members of Points save data such as [X, Y, T, P, H], [X, Y, T, P, g], . . . , [X, Y, T, P, a], . . . , etc.
2. LP of a, g, d, . . . , p is calculated.
3. a and p are selected when LP>=N. The LP of p>=M, and p can appear 2-3 times. The permutation includes Hap, Hapy, Happy, Happp, Hpay, . . . , etc.
4. A result of matching the word list includes Happy and Hap. The user selects Happy (target word).
5. The trajectory of Hapy is determined of Happy.
6. According to the trajectory, V, F, and O of each character are calculated to obtain the character size, the character line thickness, and the character shape of each character.
7. A physical vector [V, F, O] V1 of Happy and a N-dimensional word2vec vector V2 of the word vector are extracted. F1 and F2 are used to perform classification. Finally, the target word is colored in red.
8. Happy is rendered by using the character size, the character line thickness, the character shape, and the character color (red).

In some other embodiments of the present disclosure, the target word of "高兴" (i.e., Gaoxing in pinying) is taken as an example for description, which is not shown in the figure.

1. A trajectory of Gaoxing (高兴) is saved to an array Points. Members of Points save data such as [X, Y, T, P, G], [X, Y, T, P, f], . . . , [X, Y, T, P, a], . . . , etc.
2. LP of f, d, . . . , a, . . . , g is calculated.
3. a, o, x, i, and n are selected for LP>=N. An array combination includes Gaxi, Gaoxing, . . . , etc.
4. A result of matching the word list includes "高兴" "高新" and "高薪." The user finally selects 高兴 (target word).
5. The trajectory of Gaoxing of "高兴" is determined.
6. For the trajectory, average V, F, and O of the trajectory are calculated to obtain the character size, the character line thickness, and the character shape of the word.
7. The physical vector [V, F, O] V1 and the N-dimensional word2vec vector V2 of the word vector are extracted. F1 and F2 are used to perform classification. The target word is colored in red.
8. "高兴" is rendered using the character size, the character line thickness, the character shape, and the character color (red).

Figure 7:
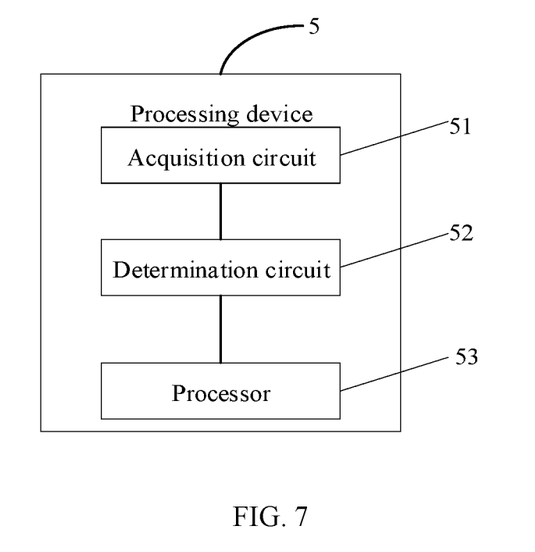
FIG. 7 illustrates a schematic structural diagram of a processing device according to some embodiments of the present disclosure.

Embodiments of the present disclosure provide a processing device 5. The processing device can be applied to the processing methods of embodiments corresponding to FIGS. 1, 2, 4, and 5. As shown in FIG. 7, the processing device 5 includes an acquisition circuit 51 and a determination circuit 52.

The acquisition circuit 51 may be configured to obtain the input information of the operator acting on the input member of the electronic apparatus. The input information may include the behavior parameter of the operator in the process of inputting the target word.

The determination circuit 52 may be configured to determine the display parameter of the target word at least based on the behavior parameter so that the target word can be displayed on the target display according to the display parameter.

The display parameter can at least represent the feature information when the operator inputs the target word.

In some other embodiments of the present disclosure, the acquisition circuit 51 may be further configured to obtain the input trajectory information of the operator acting on the keyboard or handwriting area of the electronic apparatus and obtain the target word that is to be input and the input trajectory parameter corresponding to the target word at least based on the input trajectory information.

In some other embodiments of the present disclosure, the acquisition circuit 51 may be further configured to obtain the voice input information input by the operator to the audio collection member of the electronic apparatus and obtain the target word that is to be input and the corresponding audio input parameter of the target word at least based on the voice input information.

In some other embodiments of the present disclosure, the acquisition circuit 51 may be further configured to obtain the posture input information of the operator acting on the posture collection member of the electronic apparatus and obtain the target word that is to be input and the posture input parameter corresponding to the target word at least based on the posture input information.

In some other embodiments of the present disclosure, if the behavior parameter is the input trajectory parameter, the determination circuit 52 may be further configured to determine the display parameter of the target word based on the input trajectory parameter or determine the display parameter of the target word based on the input trajectory parameter and the corresponding attribute of the target word.

In some other embodiments of the present disclosure, the determination circuit 52 may be further configured to determine the first display parameter of the target word based on the input rate of the input trajectory parameter, determine the second display parameter of the target word based on the input pressure of the input trajectory parameter, or determine the third display parameter of the target word based on a trajectory direction change parameter of the input trajectory parameter.

In some embodiments, the determination circuit 52 may be further configured to determine the fourth display parameter of the target word is determined based on the input trajectory parameter and an emotional attribute and/or a meaning attribute of the target word.

The display parameter may at least include the character size, the character line thickness, the character shape, or the character color.

In some other embodiments of the present disclosure, the determination circuit 52 may be configured to extract, from words in a first test question text, words whose type matches subject information of the first test question text and words whose type match the question type of the question where the words are located to obtain a first keyword.

A keyword may include the first keyword.

In some other embodiments of the present disclosure, the determination circuit 52 may be further configured to determine the target input trajectory corresponding to each character in the target word, determine the input rate based on the input trajectory parameter of the target touchpoint of the target input trajectory, determine the first display parameter of the target word based on the input rate, and determine the second display parameter of the target word based on the input pressure of the target touchpoint and the number of the target touchpoints.

The determination circuit 52 may be further configured to determine the basic touchpoint from the target touchpoints, and, based on the position information of the first touchpoint, the position information of the last touchpoint, and the position information of the basic touchpoint of the target touchpoints, determine the third display parameter of the target word. The trajectory direction change parameter may include the position information.

In some other embodiments of the present disclosure, if the behavior parameter includes the audio input parameter, the determination circuit 52 may be further configured to determine the display parameter of the target word based on the audio input parameter or determine the display parameter of the target word based on the audio input parameter and the corresponding attribute of the target word.

The audio input parameter may include at least one of the volume, the intonation, the tone, the timbre, or the voiceprint.

In some other embodiments of the present disclosure, if the behavior parameter includes the posture input parameter, the determination circuit 52 may be further configured to determine the display parameter of the target word based on the posture input parameter or determine the display parameter of the target word based on the posture input parameter and the corresponding attribute of the target word.

The posture input parameter may include at least one of the posture change speed, the posture change amplitude, or the posture change frequency.

In some other embodiments of the present disclosure, the apparatus may further include a processor 53.

The processor 53 may be configured to, if the electronic apparatus is connected to the second electronic apparatus, obtain the configuration parameter of the display of the second electronic apparatus, and determine the display parameter of the target word based on the configuration parameter and the behavior parameter is determined or adjust the display parameter based on the configuration parameter.

In some other embodiments, the processor 53 may be further configured to, if the electronic apparatus is in a specific operation mode, adjust the display parameter at least based on the specific operation mode.

In some other embodiments of the present disclosure, the determination circuit 52 may be further configured to determine the target display from the displays of the electronic apparatus at least according to the display parameter and display the target word on the target display, and/or determine the light-emitting parameter of the light-emitting assembly and/or the output parameter of the audio module of the electronic apparatus according to the display parameter, so as to control the light-emitting assembly to emit light based on the light-emitting parameter and/or control the audio module to output the corresponding content based on the output parameter when the target word is displayed on the target display.

For an interaction process between the units of embodiments of the present disclosure, reference may be made to the implementation process in the processing methods of embodiments corresponding to FIGS. 1, 2, 4, and 5, which is not repeated here.

The processing device of embodiments of the present disclosure can directly determine the display parameter displayed by the target word according to the behavior parameter of the operator in the process of inputting the target word. The user may not need to manually modify the display parameter of the target word. Thus, the problem in the existing technology that the font style of the modified word input to the electronic apparatus cannot reflect the personality of the input person may be solved. The intelligence of the electronic apparatus and the writing efficiency by using the electronic apparatus may be improved.

Figure 8:
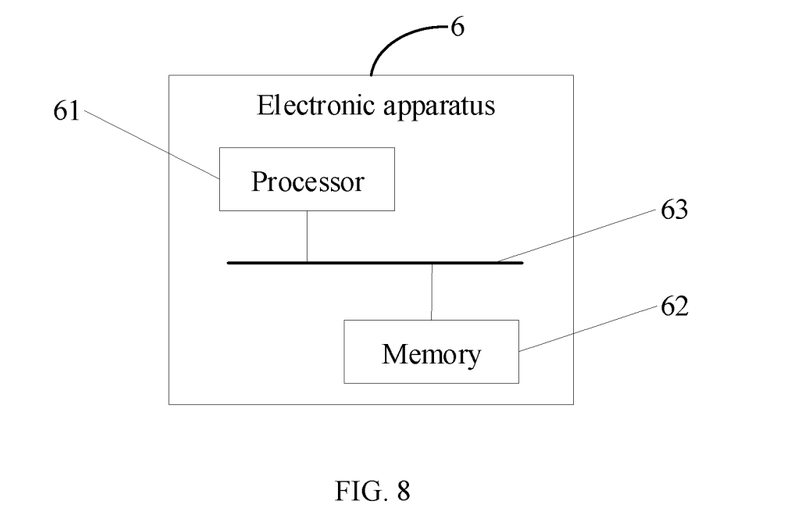
FIG. 8 illustrates a schematic structural diagram of an electronic apparatus according to some embodiments of the present disclosure.

Embodiments of the present disclosure provide an electronic apparatus 6. The electronic apparatus can be applied to the processing methods of embodiments corresponding to FIGS. 1, 2, 4, and 5. As shown in FIG. 8, the electronic apparatus 6 includes a processor 61, a memory 62, and a communication bus 63.

The communication bus 63 may be configured to realize a communication connection between the processor 61 and the memory 62.

The processor 61 may be configured to execute a processing program stored in the memory 62 to obtain the input information of the operator acting on the input member of the electronic apparatus and determine the display parameter of the target word at least based on the behavior parameter so that the target word can be displayed on the target display according to the display parameter. The input information may include the behavior parameter of the operator in the process of inputting the target word. The display parameter can at least represent the feature information when the operator inputs the target word.

In some other embodiments of the present disclosure, the processor 61 may be configured to execute the processing program stored in the memory 62 to obtain the input information when the operator acts on the input member of the electronic apparatus to obtain the input trajectory information of the operator acting on the keyboard or handwriting area of the electronic apparatus and obtain the target word that is to be input and the input trajectory parameter corresponding to the target word at least based on the input trajectory information, obtain the voice input information input by the operator to the audio collection member of the electronic apparatus and obtain the target word that is to be input and the corresponding audio input parameter of the target word at least based on the voice input information, or obtain the posture input information of the operator acting on the posture collection member of the electronic apparatus and obtain the target word that is to be input and the posture input parameter corresponding to the target word at least based on the posture input information.

In some other embodiments of the present disclosure, if the behavior parameter is the input trajectory parameter, the processor 61 is configured to execute the processing program stored in the memory 62 to determine the display parameter of the target word at least based on the behavior parameter to determine the display parameter of the target word based on the input trajectory parameter or determine the display parameter of the target word based on the input trajectory parameter and the corresponding attribute of the target word.

In some other embodiments of the present disclosure, the processor 61 may be further configured to execute the processing program stored in the memory 62 to determine the display parameter of the target word based on the input trajectory parameter to determine the first display parameter of the target word based on the input rate of the input trajectory parameter, determine the second display parameter of the target word based on the input pressure of the input trajectory parameter, or determine the third display parameter of the target word based on a trajectory direction change parameter of the input trajectory parameter.

In some other embodiments, the processor 61 may be further configured to execute the processing program stored in the memory 62 to determine the display parameter of the target word based on the input trajectory parameter and the corresponding attribute of the target word to determine the fourth display parameter of the target word is determined based on the input trajectory parameter and an emotional attribute and/or a meaning attribute of the target word.

The display parameter may at least include the character size, the character line thickness, the character shape, or the character color.

In some other embodiments of the present disclosure, the processor 61 may be configured to execute the processing program stored in the memory 62 to determine the display parameter of the target word based on the input trajectory parameter to determine the target input trajectory corresponding to each character in the target word, determine the input rate based on the input trajectory parameter of the target touchpoint of the target input trajectory, determine the first display parameter of the target word based on the input rate, determine the second display parameter of the target word based on the input pressure of the target touchpoint and the number of the target touchpoints, determine the basic touchpoint from the target touchpoints, and, based on the position information of the first touchpoint, the position information of the last touchpoint, and the position information of the basic touchpoint of the target touchpoints, determine the third display parameter of the target word. The trajectory direction change parameter may include the position information.

In some other embodiments of the present disclosure, if the behavior parameter includes the audio input parameter, the processor 61 may be further configured to execute the processing program stored in the memory 62 to determine the display parameter of the target word at least based on the behavior parameter to determine the display parameter of the target word based on the audio input parameter or determine the display parameter of the target word based on the audio input parameter and the corresponding attribute of the target word.

The audio input parameter may include at least one of the volume, the intonation, the tone, the timbre, or the voiceprint.

In some other embodiments of the present disclosure, if the behavior parameter includes the posture input parameter, the processor 61 may be further configured to execute the processing program stored in the memory 62 to determine the display parameter of the target word at least based on the behavior parameter to determine the display parameter of the target word based on the posture input parameter or determine the display parameter of the target word based on the posture input parameter and the corresponding attribute of the target word.

The posture input parameter may include at least one of the posture change speed, the posture change amplitude, or the posture change frequency.

In some other embodiments of the present disclosure, the processor 61 may be further configured to execute the processing program stored in the memory 62 to, if the electronic apparatus is connected to the second electronic apparatus, obtain the configuration parameter of the display of the second electronic apparatus, and determine the display parameter of the target word based on the configuration parameter and the behavior parameter is determined or adjust the display parameter based on the configuration parameter.

In some other embodiments, the processor 61 may be further configured to execute the processing program stored in the memory 62 to, if the electronic apparatus is in a specific operation mode, adjust the display parameter at least based on the specific operation mode.

In some other embodiments of the present disclosure, the processor 61 may be further configured to execute the processing program stored in the memory 62 to determine the target display from the displays of the electronic apparatus at least according to the display parameter and display the target word on the target display, and/or determine the light-emitting parameter of the light-emitting assembly and/or the output parameter of the audio module of the electronic apparatus according to the display parameter, so as to control the light-emitting assembly to emit light based on the light-emitting parameter and/or control the audio module to output the corresponding content based on the output parameter when the target word is displayed on the target display to display the target word on the target display according to the display parameter.

For the specific implementation process of the steps executed by the processor of embodiments of the present disclosure, reference may be made to the implementation process in the processing methods of embodiments corresponding to FIGS. 1, 2, 4, and 5, which is not repeated here.

The processing device of embodiments of the present disclosure can directly determine the display parameter displayed by the target word according to the behavior parameter of the operator in the process of inputting the target word. The user may not need to manually modify the display parameter of the target word. Thus, the problem in the existing technology that the font style of the modified word input to the electronic apparatus cannot reflect the personality of the input person may be solved. The intelligence of the electronic apparatus and the writing efficiency by using the electronic apparatus may be improved.

Embodiments of the present application provide a computer-readable storage medium. The computer-readable storage medium stores one or more programs. The one or more programs can be executed by one or more processors to realize the steps in the processing methods of embodiments corresponding to FIGS. 1, 2, 4, and 5.

For the specific implementation process of the steps executed by the processor embodiments of the present disclosure, reference may be made to the implementation process in the processing methods of embodiments corresponding to FIGS. 1, 2, 4, and 5, which is not repeated here.

Those skilled in the art should understand that embodiments of the present disclosure may be provided as a method, a system, or a computer program product. Thus, the present disclosure may include forms of a hardware embodiment, a software embodiment, or an embodiment combining software and hardware aspects. Furthermore, the present disclosure may include a form of implementing a computer program product in one or more computer-readable storage media (e.g., including but not limited to disk storage, optical storage, etc.) having computer-usable program code.

The present disclosure is described with reference to the flowcharts and/or block diagrams of the methods, the apparatus (systems), and the computer program products according to embodiments of the present disclosure. Each flow and/or block in the flowcharts and/or block diagrams and a combination of flows and/or blocks in the flowcharts and/or block diagrams can be implemented by computer program instructions. These computer program instructions may be provided to processors of a general purpose computer, a special purpose computer, an embedded processor, or other programmable data processing devices to produce a machine such that the instructions executed by the processor of the computer or other programmable data processing devices may produce a device for implementing the functions specified in a flow or flows of the flowcharts and/or a block or blocks of the block diagrams.

These computer program instructions may also be stored in a computer-readable memory capable of guiding the computer or other programmable data processing apparatus to function in a particular manner. Thus, the instructions stored in the computer-readable memory may result in a manufactured article including an instruction device. The instruction device may implement the functions specified in the flow or flows of the flowcharts and/or the block or blocks of the block diagrams.

These computer program instructions can also be loaded on the computer or other programmable data processing apparatuses to perform a series of operational steps on the computer or other programmable apparatuses to produce a process that is implemented by the computer. Thus, the instructions executed on the computer or other programmable apparatuses may provide steps for implementing the functions specified in the flow or blocks of the flowcharts and/or the block or blocks of the block diagrams.

Only some embodiments of the present disclosure are described above, which is not intended to limit the scope of the present disclosure.

What is claimed is:

1. A processing method, comprising:
obtaining input information from a touch screen of an electronic apparatus, the input information including a behavior parameter in a process of inputting a target word, a meaning attribute, and an emotional attribute of the target word, and obtaining the input information from the touch screen including:
obtaining input trajectory information from a keyboard or handwriting area of the electronic apparatus; and
obtaining the target word that is to be input and an input trajectory parameter corresponding to the target word based on the input trajectory information, the input trajectory parameter including an input pressure of the target touchpoints and a number of the target touchpoints; and
determining a display parameter of the target word based on the behavior parameter, the meaning attribute, and the emotional attribute of the target word, to display the target word on a target display according to the display parameter includes at least one of: a character size, a character line thickness, a character shape, or a character color, including:
determining the display parameter of the target word based on the input trajectory parameter and the meaning attribute of the target word; or
determining the display parameter of the target word based on the input trajectory parameter, the meaning attribute of the target word, and an emotional attribute of the target word;
wherein the emotional attribute of the target word being determined based on the meaning attribute of the target word or a context in an interactive content of the target word; and
the emotional attribute is determined based on a context in an interactive content and a physical vector including at least one of speed, pressure, and angle based touch attribute information of the touchpoints.

2. The method of claim 1, wherein obtaining the input information from the input member of the electronic apparatus includes:
obtaining audio input information input by an audio collection member of the electronic apparatus, and obtaining the target word that is to be input and an audio input parameter corresponding to the target word based on at least the audio input information, the audio input parameter including at least one of an intonation or a tone; or
obtaining posture input information by a posture collection member of the electronic apparatus and obtaining the target word that is to be input and a posture input parameter corresponding to the target word based on the posture input information.

3. The method of claim 2, wherein:
determining the display parameter of the target word includes at least one of:
determining a first display parameter of the target word based on an input rate of the input trajectory parameter;
determining a second display parameter of the target word based on the input pressure of the input trajectory parameter;
determining a third display parameter of the target word based on a trajectory direction change parameter in the input trajectory parameter; or
determining a fourth display parameter of the target word based on the input trajectory parameter, the emotional attribute, and the meaning attribute of the target word.

4. The method of claim 3, wherein determining the display parameter of the target word includes at least one of:
determining a target input trajectory corresponding to each character in the target word;
determining the input rate based on the input trajectory parameter of target touchpoints of the target input trajectory and determining the first display parameter of the target word based on the input rate; or
determining a basic touchpoint from the target touchpoints, and, based on position information of a first touchpoint, position information of a last touchpoint, and position information of the basic touchpoint of the target touchpoints, determining the third display parameter of the target word, the trajectory direction change parameter including position information.

5. The method of claim 2, wherein in response to the behavior parameter being the audio input parameter, determining the display parameter of the target word includes:
   determining the display parameter of the target word based on the audio input parameter and the meaning attribute of the target word; or
   determining the display parameter of the target word based on the audio input parameter, the meaning attribute of the target word, and an emotional attribute of the target word;
   wherein the audio input parameter further includes at least one of a volume, a timbre, or a voiceprint.

6. The method of claim 2, wherein in response to the behavior parameter being the posture input parameter, determining the display parameter of the target word includes:
   determining the display parameter of the target word based on the posture input parameter and the meaning attribute of the target word; or
   determining the display parameter of the target word based on the posture input parameter, the meaning attribute of the target word, and an emotional attribute of the target word;
   wherein the posture input parameter includes at least one of a posture change speed, a posture change amplitude, or a posture change frequency.

7. The method of claim 1, further comprising:
   in response to the electronic apparatus being in a connection state with a second electronic apparatus, obtaining a configuration parameter of a display of the second electronic apparatus, and determining the display parameter of the target word based on the configuration parameter, the behavior parameter, and the meaning attribute of the target word, or adjusting the display parameter based on the configuration parameter; or
   in response to the electronic apparatus being in a specific operation mode, adjusting the display parameter based on the specific operation mode.

8. The method of claim 1, wherein displaying the target word on the target display according to the display parameter includes:
   determining the target display from displays of the electronic apparatus according to the display parameter and displaying the target word on the target display; and/or
   determining a light-emitting parameter of a light-emitting assembly and/or an output parameter of an audio module of the electronic apparatus according to the display parameter, so as to control the light-emitting assembly to emit light based on the light-emitting parameter and/or control the audio module to output a corresponding content based on the output parameter when the target word is displayed on the target display.

9. The processing method of claim 1, wherein:
   the input information further includes an emotional attribute of the target word, the emotional attribute of the target word being determined based on the meaning attribute of the target word or a context in an interactive content of the target word;
   determining the display parameter of the target word includes:
      determining the display parameter of the target word based on the behavior parameter, the meaning attribute of the target word, and the emotional attribute of the target word; and
   the emotional attribute is determined based on a context in an interactive content and a physical vector including speed, pressure, and angle.

10. A processing device, comprising:
   an acquisition circuit, configured to obtain input information from a touch screen of an electronic apparatus, the input information including a behavior parameter in a process of inputting a target word, a meaning attribute, and an emotional attribute of the target word, and obtaining the input information from the touch screen including:
      obtaining input trajectory information from a keyboard or handwriting area of the electronic apparatus; and
      obtaining the target word that is to be input and an input trajectory parameter corresponding to the target word based on the input trajectory information, the input trajectory parameter including an input pressure of the target touchpoints and a number of the target touchpoints; and
   a determination circuit, configured to determine a display parameter of the target word based on the behavior parameter, the meaning attribute, and the emotional attribute of the target word, to display the target word on a target display according to the display parameter, wherein the display parameter includes at least one of: a character size, a character line thickness, a character shape, or a character color, including:
      determining the display parameter of the target word based on the input trajectory parameter the meaning attribute of the target word; or
   determining the display parameter of the target word based on the input trajectory parameter, the meaning attribute of the target word, and an emotional attribute of the target word;
   wherein the emotional attribute of the target word being determined based on the meaning attribute of the target word or a context in an interactive content of the target word; and
      the emotional attribute is determined based on a context in an interactive content and a physical vector including at least one of speed, pressure, and angle based touch attribute information of the touchpoints.

11. The device of claim 10, wherein the acquisition circuit is further configured to:
   obtain audio input information input by an audio collection member of the electronic apparatus, and obtain the target word that is to be input and an audio input parameter corresponding to the target word based on at least the audio input information, the audio input parameter including at least one of an intonation or a tone; or
   obtain posture input information by a posture collection member of the electronic apparatus and obtain the target word that is to be input and a posture input parameter corresponding to the target word based on the posture input information.

12. The device of claim 11, wherein the determination circuit is further configured to at least one of:
   determine a first display parameter of the target word based on an input rate of the input trajectory parameter;
   determine a third display parameter of the target word based on a trajectory direction change parameter in the input trajectory parameter; or
   determine a fourth display parameter of the target word based on the input trajectory parameter, the emotional attribute, and the meaning attribute of the target word.

13. The device of claim 11, wherein in response to the behavior parameter being the audio input parameter, the determination circuit is further configured to determine:
the display parameter of the target word based on the audio input parameter and the meaning attribute of the target word; or
the display parameter of the target word based on the audio input parameter, the meaning attribute of the target word, and an emotional attribute of the target word;
wherein the audio input parameter further includes at least one of a volume, a timbre, or a voiceprint.

14. The device of claim 11, wherein in response to the behavior parameter being the posture input parameter, the determination circuit is further configured to determine:
the display parameter of the target word based on the posture input parameter and the meaning attribute of the target word; or
the display parameter of the target word based on the posture input parameter, the meaning attribute of the target word, and an emotional attribute of the target word;
wherein the posture input parameter includes at least one of a posture change speed, a posture change amplitude, or a posture change frequency.

15. The device of claim 10, further comprising a processor, the processor being configured to:
in response to the electronic apparatus being in a connection state with a second electronic apparatus, obtain a configuration parameter of a display of the second electronic apparatus, and determine the display parameter of the target word based on the configuration parameter, the behavior parameter, and the meaning attribute of the target word, or adjust the display parameter based on the configuration parameter; or
in response to the electronic apparatus being in a specific operation mode, adjust the display parameter based on the specific operation mode.

16. The device of claim 10, wherein the determination circuit is further configured to determine:
the target display from displays of the electronic apparatus according to the display parameter and displaying the target word on the target display; and/or
a light-emitting parameter of a light-emitting assembly and/or an output parameter of an audio module of the electronic apparatus according to the display parameter, so as to control the light-emitting assembly to emit light based on the light-emitting parameter and/or control the audio module to output a corresponding content based on the output parameter when the target word is displayed on the target display.

17. An electronic apparatus, comprising:
a processor; and
a memory storing a processing program that, when executed by the processor, causes the processor to:
obtain input information from a touch screen of an electronic apparatus, the input information including a behavior parameter in a process of inputting a target word, a meaning attribute, and an emotional attribute of the target word, and obtaining the input information from the touch screen including:
obtaining input trajectory information from a keyboard or handwriting area of the electronic apparatus; and
obtaining the target word that is to be input and an input trajectory parameter corresponding to the target word based on the input trajectory information, the input trajectory parameter including an input pressure of the target touchpoints and a number of the target touchpoints; and
determine a display parameter of the target word based on the behavior parameter, the meaning attribute, and the emotional attribute of the target word, to display the target word on a target display according to the display parameter, wherein the display parameter includes at least one of: a character size, a character line thickness, a character shape, or a character color, including:
determining the display parameter of the target word based on the input trajectory parameter and the meaning attribute of the target word; or
determining the display parameter of the target word based on the input trajectory parameter, the meaning attribute of the target word, and an emotional attribute of the target word;
wherein the emotional attribute of the target word being determined based on the meaning attribute of the target word or a context in an interactive content of the target word; and
the emotional attribute is determined based on a context in an interactive content and a physical vector including at least one of speed, pressure, and angle based touch attribute information of the touchpoints.

18. The apparatus of claim 17, wherein the processor is further caused to:
obtain the target word that is to be input and an input trajectory parameter corresponding to the target word based on the input trajectory information;
obtain audio input information input by an audio collection member of the electronic apparatus and obtain the target word that is to be input and an audio input parameter corresponding to the target word based on at least the audio input information; or
obtain posture input information by a posture collection member of the electronic apparatus and obtain the target word that is to be input and a posture input parameter corresponding to the target word based on the posture input information.

* * * * *